United States Patent
Miani et al.

(10) Patent No.: US 10,151,533 B2
(45) Date of Patent: Dec. 11, 2018

(54) DEVICE FOR TRANSFERRING A METALLURGICAL MATERIAL

(75) Inventors: Stefano Miani, Premariacco (IT); Riccardo Gottardi, Udine (IT)

(73) Assignee: SMS CONCAST ITALIA S.P.A., Udine (IT)

(*) Notice: Subject to any disclaimer, the term of this patent is extended or adjusted under 35 U.S.C. 154(b) by 1309 days.

(21) Appl. No.: 14/128,860

(22) PCT Filed: Jun. 28, 2012
(Under 37 CFR 1.47)

(86) PCT No.: PCT/EP2012/062611
§ 371 (c)(1),
(2), (4) Date: Nov. 13, 2014

(87) PCT Pub. No.: WO2013/007531
PCT Pub. Date: Jan. 17, 2013

(65) Prior Publication Data
US 2015/0211797 A1    Jul. 30, 2015

(30) Foreign Application Priority Data
Jul. 12, 2011    (EP) .................................... 11173675

(51) Int. Cl.
F27D 13/00    (2006.01)
F27D 3/14    (2006.01)
(Continued)

(52) U.S. Cl.
CPC ............ *F27D 3/0033* (2013.01); *C21C 5/565* (2013.01); *F27B 3/18* (2013.01); *F27B 3/186* (2013.01);
(Continued)

(58) Field of Classification Search
CPC . C21C 5/565; C21C 5/527; F27B 3/18; F27B 3/186; F27D 11/12; F27D 13/00;
(Continued)

(56) References Cited

U.S. PATENT DOCUMENTS 3,233,995 A * 2/1966 Javaux .................... C03B 18/18
                                                  65/182.4
3,432,285 A * 3/1969 Gulotta ................... C03B 18/08
                                                  65/182.4
(Continued)

FOREIGN PATENT DOCUMENTS

CN    1102662 C    3/2003
CN    201413038 Y    2/2010
(Continued)

OTHER PUBLICATIONS

Search Report for CN 201280033984.2 dated Feb. 28, 2015.
(Continued)

*Primary Examiner* — Michael Laflame, Jr.
(74) *Attorney, Agent, or Firm* — Thomas Horstemeyer, LLP

(57) ABSTRACT

The invention relates to a device having a bottom, side walls and a ceiling, which together define a channel, as well as transportation means, extending in an axial direction of the channel from an entry port of the channel to an exit port of the channel, for transferring a metallurgical material from the entry port to the exit port.

20 Claims, 1 Drawing Sheet

(51) Int. Cl.
    F27D 3/00    (2006.01)
    C21C 5/56    (2006.01)
    F27B 3/18    (2006.01)
    F27D 11/12   (2006.01)
    C21C 5/52    (2006.01)
(52) U.S. Cl.
    CPC ............... F27D 3/14 (2013.01); F27D 11/12 (2013.01); F27D 13/00 (2013.01); F27D 13/002 (2013.01); *C21C 5/527* (2013.01); *Y02P 10/216* (2015.11)
(58) Field of Classification Search
    CPC ........ F27D 13/002; F27D 3/0033; F27D 3/14; Y02P 10/216
    USPC .......................................................... 373/80
    See application file for complete search history.

(56) References Cited

U.S. PATENT DOCUMENTS

| | | | | |
|---|---|---|---|---|
| 3,661,548 | A * | 5/1972 | Ito | C03B 18/06 65/182.4 |
| 3,853,523 | A * | 12/1974 | Dickinson | C03B 18/06 65/99.5 |
| 4,017,061 | A | 4/1977 | Manz et al. | |
| 4,297,121 | A * | 10/1981 | Rhonehouse | B65G 13/07 65/348 |
| 4,836,732 | A * | 6/1989 | Vallomy | C21C 5/527 373/79 |
| 5,400,358 | A | 3/1995 | Vallomy | |
| 5,562,810 | A * | 10/1996 | Urquhart | C25D 13/22 204/213 |
| 6,389,054 | B1 * | 5/2002 | Stercho | F27B 3/18 373/79 |
| 8,420,172 | B1 * | 4/2013 | Loper | E04D 1/20 427/289 |
| 2004/0056394 | A1 * | 3/2004 | Jackson | B22D 11/11 266/216 |
| 2005/0274149 | A1 * | 12/2005 | Hoppe | C03B 37/01214 65/411 |
| 2007/0063172 | A1 * | 3/2007 | Samson | C04B 20/06 252/378 P |
| 2008/0272114 | A1 * | 11/2008 | Taguchi | H05B 6/701 219/690 |

FOREIGN PATENT DOCUMENTS

| | | |
|---|---|---|
| DE | 102008004775 A1 | 7/2009 |
| EP | 0247923 A1 | 12/1987 |
| EP | 1567680 B1 | 4/2011 |
| WO | 2005025774 A2 | 3/2005 |

OTHER PUBLICATIONS

English Translation of the Abstract for CN 1102662 published on Mar. 5, 2003.

English Translation of the Abstract for CN 201413038 published on Feb. 24, 2010.

The International Search Report and Written Opinion dated Sep. 4, 2012.

* cited by examiner

DEVICE FOR TRANSFERRING A METALLURGICAL MATERIAL

CROSS-REFERENCE TO RELATED APPLICATIONS

This application is the 35 U.S.C. § 371 national stage of PCT application PCT/EP2012/062611, filed Jun. 28, 2012 which claims priority to European Patent Application No. 11173675.7, dated Jul. 12, 2011, both of which are incorporated by reference in their entirety.

BACKGROUND

A device is known from U.S. Pat. No. 5,400,358 A used for preheating of a principally metallic charge in a corresponding channel like (tunnel like) preheating chamber. The channel has an entry port, also called as a transition region, followed in the transport direction of the metallic charge by a so-called heating zone and a discharge section, defining an exit port of said channel, from where the preheated metallic charge is fed directly or via intermediate installations into a metallurgical melting vessel like an electric arc furnace.

BRIEF DESCRIPTION OF THE DRAWINGS

Further aspects of the present disclosure will be readily appreciated upon review of the detailed description of its various embodiments, described below, when taken in conjunction with the accompanying drawings.

DETAILED DESCRIPTION

Figures 1A, 1B:
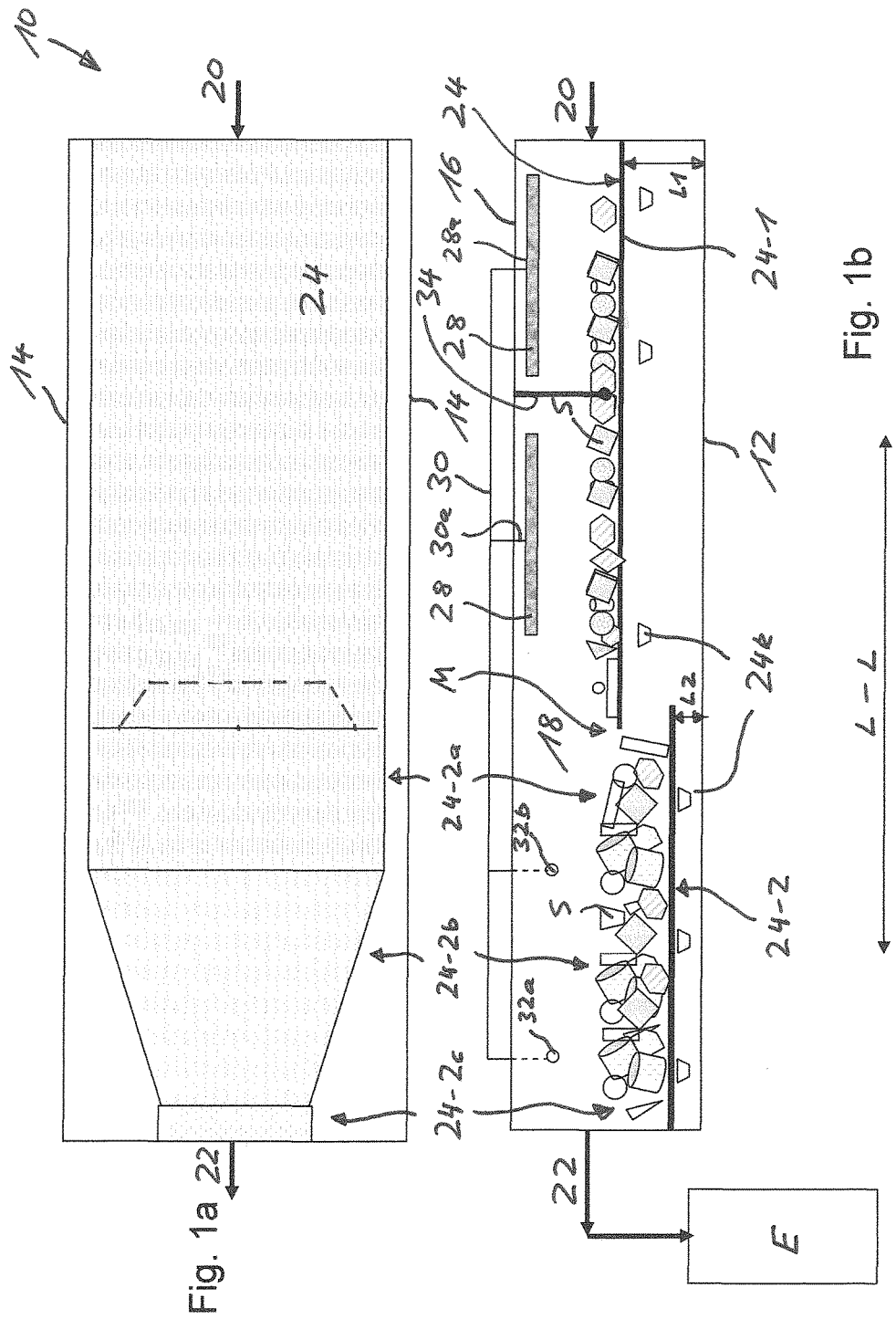
FIG. 1a illustrates schematically a view from above onto a transportation means in a device according to various embodiments of the present disclosure.
FIG. 1b illustrates schematically a vertical sectional view of the device of FIG. 1a according to various embodiments of the present disclosure.

The present disclosure relates to a device having a bottom, side walls and a ceiling, which together define a channel, as well as transportation means, extending in an axial direction of said channel from an entry port of the channel to an exit port of said channel, for transferring a metallurgical material from said entry port to said exit port.

Such a device is known from U.S. Pat. No. 5,400,358 A and used for preheating of a principally metallic charge in a corresponding channel like (tunnellike) preheating chamber. The channel has an entry port, also called as a transition region, followed in the transport direction of the metallic charge by a so-called heating zone and a discharge section, defining an exit port of said channel, from where the preheated metallic charge is fed directly or via intermediate installations into a metallurgical melting vessel like an electric arc furnace.

The term metallic charge characterizes a metallurgical material like pig iron, iron bearing material, HBI (hot briquetted iron), DRI (direct reduced iron), scrap material etc., hereinafter commonly called scrap.

The term "channel or tunnellike" describes the general design of said device but is not limited to any specific elongation, dimension, construction etc.

The axial direction of said device corresponds to the general transport direction of the scrap, handled within said device, as the scrap material is typically continuously fed through said device and then directly or indirectly (for example via an intermediate collecting bin) into the associated metallurgical vessel.

The heat treatment is effected by fumes from the furnace which are guided (mostly in counterflow to the scrap) through said device. The heat transfer is mainly by convection.

Although typically conveyors are used to transport the scrap through said device and vibrating and/or oscillating conveyors are preferred in order to forward the scrap material within said channel the transportation means may be of any type. They are generally aligned in a more or less horizontal fashion but slanted arrangements may be realized as well. This is true not only with respect to the active transportation surface (which equals that part of the transportation means covered by scrap) of the transportation means, but as well for the general arrangement of the transportation means.

The preheating of the scrap is important to reduce the temperature difference between the scrap when fed into the melting vessel and the melt already present in the vessel.

One disadvantage of devices according to prior art is that only the upper layer of the scrap material, transported onto said conveyor, is preheated to a considerable degree while any material below that upper layer and especially the scrap of the lower layer, which is in a more or less direct contact with the conveyor, is in most applications insufficiently preheated. With regard to the lowermost scrap layer the cooling of the conveyor by water and/or air even contradicts the preheating aspect.

A consequence of this is a big temperature stratification within the scrap material arranged in various layers onto the conveyor. In prior art devices the total thickness of all layers of the scrap material onto the conveyor is about 800 mm, ranging from 600-1000 mm, while the width of the conveyor is typically in the range of 1.50 to 2.5 m to fit with the charge opening of the associated intermediate bin or the metallurgical vessel respectively.

U.S. Pat. No. 5,400,358 A further discloses to provide safety burners at the material discharge end of the preheating chamber but installation of these burners leads to further problems:

Such burners as injection burners provide spot-like flames and insofar spot-like heating-zones, leading to an inhomogenous heating of the scrap material. They may also cause formation of melt-phases in the upper scrap layer, which melt may then penetrate into the subjacent zones (layers) of the scrap material and/or onto the conveyor, thereby solidifying in an uncontrollable manner and causing additional technical problems.

It is an object of the present disclosure to provide a device of the type mentioned which leads to a more effective pre-heating of the scrap.

This object is achieved by a device having a bottom, side walls and a ceiling, which together define a channel, as well as transportation means, extending in an axial direction of said channel from an entry port of the channel to an exit port of said channel, for transferring a metallurgical material from said entry port to said exit port, wherein the transportation means have a larger width close to the entry port than close to the exit port. This means a considerable difference, not manufacturing tolerances.

The transportation means can be conveyor means, for example an oscillating conveyor, optionally equipped with lateral flares, wherein the flares along that part of the transportation means with smaller width may have a greater height, perpendicular to the transportation level, than the flares along that part of the transportation means with larger width.

As the total mass of scrap should remain at least equal (compared with prior art devices) and constant along its way through the preheating device it becomes apparent that a wider conveyor system allows to reduce the thickness of the total scrap layer.

While prior art conveying systems usually have a conveyor width of 1.50 to 2.5 m and a total scrap layer thickness of about 60-100 cm the new system increases the width of the transporting means to at least 3.0 m+/−0.5 m, i.e. the width (perpendicular to the transportation direction of the scrap) is approximately doubled so that the thickness of the scrap layer may be reduced by about 50% with the proviso to keep the scrap mass more or less constant. The width may be ≥3.5 m, for example ≥4.0 m.

Charging the scrap into the furnace is done via a so called charging window in the furnace, which window has a limited size.

Insofar it becomes necessary to reduce the width of the transportation means again before the scrap is charged into the furnace, or, in other words: the conveyor or associated charging apparatus should fit the furnace dimensions.

In this respect the device of the present disclosure proposes to reduce the width of the transportation means before the scrap leaves the device or shortly thereafter, i.e. in any case before the scrap is charged into the furnace. Insofar the term "close to the exit port" includes an embodiment according to which the size reduction of the transport means is effected outside the channel of said device According to one embodiment of the device of the present disclosure the width of the transportation means diminishes by a factor of 10 to 90% along the channel between entry port and exit port. This range may be between 20% and 80% or 40% and 60% in typical applications. This should be done according to one optional embodiment along a last third of the channel seen in the axial direction of the channel, starting at the entry port, for example shortly before or after the exit port of the channel.

The width of the transport means can be reduced stepwise or in a continuous fashion. Any steps may be arranged fully or partly perpendicular to the transport direction of the scrap and/or fully or partly angled with respect to the longitudinal axis of the device, for example angled by 10-80 degrees, or 20-70 degrees and/or with sloped surfaces. In a top view the step may have the shape of a trapezoid (trapeze) or a polygon.

A more intensive pre-heating could be achieved as well by a longer resting time of the scrap in the channel, but then either a longer device becomes necessary or the charge must be reduced, both being unwanted.

Comparative test were carried out to investigate the temperature profile within different scrap layers after a heat treatment and transport along a certain distance.

Test series A relate to a prior art heat treatment by fumes (1400° C.) from an electric arc furnace which are introduced at the exit port of a pre-heating device and guided through the channel in a counter-flow to the scrap. The scrap is transported in a layer of 80 cm height on a water cooled conveyor of 1.5 m width. The total length of the device/channel between entry and exit is 30 m.

Test series B differs from A by the use of a pre-heating device, wherein the conveyor has a width of 3 m and the scrap layer a thickness/height of 40 cm.

The following temperatures (0° C.) were measured:

| | Test A | Test B |
|---|---|---|
| at the entry port at the scrap surface | 30 | 30 |
| 5 m behind entry port and at the scrap surface | 260 | 280 |
| 5 m behind entry port and 15 cm under the scrap surface | 50 | 75 |
| 10 m behind entry port and at the surface | 410 | 450 |
| 10 m behind entry port and 25 cm under the scrap surface | 70 | 80 |
| 20 m behind the entry port and at the scrap surface | 690 | 780 |
| 20 m behind the entry port and 10 cm under the scrap surface | 350 | 470 |
| 20 m behind the entry port and 30 cm under the scrap surface | 70 | 80 |

It becomes clear that pre-heating is characteristically improved when the scrap layer is thinner. Scrap layer of 20 to 50 cm thickness seems to give good results in pre-heating chambers of common length (25-40 m, most about 25-35 m).

The heat transfer further improves by radiation heating because of the intensive contact between radiation heat and scrap.

The heating efficiency can be further increased by mixing the scrap during its way through the pre-heating device so that scrap pieces, which at the entrance of the device are arranged in the lowermost scrap layer and insofar in close contact to the (water) cooled conveyor, get the chance to move upwards, to the top of the total scrap layer or at least to a position closer to the upper surface of the scrap material than before and/or in another orientation and insofar in a different contact with the fumes sucked or blown through the channel and/or the radiation heat deriving from corresponding radiation heaters/burners in that part of the device.

This turning or twisting of the scrap pieces may be achieved by different constructional concepts. One is to provide the transportation means with at least one step so that the scrap pieces are urged to fall down along said step to a lower transportation level. Such a step lowers the transport level of the transport means. For applications mentioned such a step may have a vertical height of ≥20 cm, ≥30 cm, ≥40 cm or ≥50 cm.

According to another embodiment of the device of the present disclosure at least one constructional means for changing the position of at least part of the metallurgical material transported onto said transportation means along its way through the channel between said entry port and said exit port is provided.

Another concept is based on mechanical installations along the transportation path for the scrap. Such a mechanical element, protruding into the transportation path of the scrap material, urges the scrap pieces, which get in contact with this installation, to turn around, to tilt, to topple etc. This mechanical element may be statically arranged or moveably.

Mixing of the scrap during its pre-heating avoids or reduces the danger that melt-phases are created in the scrap material while at the same time increases the average scrap temperature before charging into the furnace.

To further improve the preheating of the scrap the present disclosure provides a device with at least one heating element, based on radiant energy, being arranged between said entry port and said exit port in such a way that radiant heat released by said heating element being directed towards the metallurgical material onto said transportation means.

The selection of radiation based heating elements like radiation burners is based on the fact that the heat transfer mechanism of such radiation heaters is predominantly based on radiation and not on a flame.

As a first consequence the use of such radiation elements avoids any heating spots but instead leads to heat diffusion and as a consequence thereof to a much more uniform scrap heating.

Secondly the "residence time" of the heat, provided by said radiation based heating elements, is much longer than that of fumes, sucked through the transportation channel.

A known suction system typically works with a fumes speed of 20 to 40 m/s, thus limiting the residence time of the fumes within the channel to about 1 second in view of a typical channel length of 20 to 40 m. Insofar the heat transfer to the scrap material is improved by radiation heaters as they operate independently of the fumes velocity.

This is true for continuously operating systems as well as for so called stationary heating devices.

The effectiveness of said radiation elements is increased when any intermediate installations between the heating elements and the scrap to be heated are avoided so that radiation heat may reach the scrap material directly.

One option is to install the one or more heating element(s) in or below the ceiling of said device (tunnel). While corresponding access ducts for fuel, gas etc. should best be installed outside the channel the active radiation surface of the heating elements is preferably totally available within the channel and best just opposite the scrap to be heated. According to one embodiment the radiation heaters are arranged on moveable supports so that their active surface (emitting the radiation) may be adjusted individually. By large radiation surfaces and/or a reduced distance between heater and scrap the heat transfer is increased.

The heating element may be a batwing radiator with an radiation active surface of considerable size, for example with a radiation active surface of $\geq 0.5$ m$^2$.

In principle the new technology allows to preheat the scrap just by one radiation heater of a suitable size.

One option is to construct the complete ceiling or at least sections of said ceiling of the device as a radiation heater, but typically several radiation heaters/burner will be installed at a certain distance to each other in the respective area of the preheating chamber.

The one or more heating elements should preferably being arranged along a first section of the channel, starting at the entry port (inlet opening), wherein said section may extend over at least or maximum ⅕, ¼ or ⅓ of the total length of said channel, i.e. within a section of said channel where the temperature difference between the heating elements and the scrap typically is much higher than in a section of said chamber close to the exit port and close to the associated metallurgical vessel.

The number, size and design of said radiation heaters are dependent of the respective plant. With the proviso that the transport reduce of the transport system (transportation means) typically equals more or less the surface of the scrap layer transported thereon the total active radiation surface of said one or more heating elements may be $\geq 10\%$ of the total transport surface of said transportation means along a corresponding axial length of said channel. The relation may be increased to $\geq 20\%$, $\geq 30\%$, $\geq 40\%$ or $\geq 50\%$ in order to increase the heat transfer to the scrap material.

Although the heating elements may be arranged at any place of the channel it is preferred to install the heating elements at a certain distance above the transportation means.

The heating elements may be ceramic radiation burners, for example so called porous burner modules and/or radiation burners according to DE102000904775 AI.

Use of these radiation burners reduces the energy demand while at the same emissions are reduced. These heating elements may be fired by fossil fuel but radiation heaters may as well be activated by electric energy.

According to one embodiment any fumes, generated by the radiation burners/heating elements may be collected and transferred via a corresponding duct to a position distinct from that of the burners, where these fumes may be fed into the channel as a heating gas, which is then guided over or into the scrap layer to further increase the scrap temperature before the scrap is fed into the furnace.

The general idea in this respect is to provide at least one duct having at least one inlet port associated to an exhaust portion of at least one heating element and at least one outlet port, entering (opening into) the channel, through which an exhaust gas from said at least one heating element may be fed as a heating gas back into the channel.

While the inlet port of this duct (pipeline) may be arranged in that part of the device equipped with radiation burners, for example in the first third of the channel, the outlet port may enter the channel along the second third or the third third of the channel, in each case seen in the axial direction of the channel, starting at the entry port.

The latter technology may be combined with a traditional heating by fumes from the furnace as described with respect to prior art above.

Another optional feature provides to arrange the heating elements in an adjustable manner within said channel so as to optimize the heat transfer depending on the design of the corresponding scrap layer.

Further features of the device of the present disclosure are disclosed in the sub-claims and the other applications documents, including the following description of one specific embodiment.

Individual features according to this present disclosure may be combined with others if technically helpful even if not specifically disclosed, expect those combinations which are exempted.

The drawing illustrates schematically in

FIG. 1a shown is a view from above onto a transportation means in a device according to the present disclosure.

FIG. 1b illustrates schematically a vertical sectional view of the device of FIG. 1a The device 10 shown is for preheating scrap (symbolized in various shapes and numeral S in FIG. 1b) before the scrap S is charge into in electric arc furnace E.

The device comprises a bottom 12, side walls 14 and a ceiling 16, all together forming a tunnel with a channel 18 extending between an entry port 20 (inlet) and an exit port 22 (outlet) in a longitudinal direction L-L. A conveyor 24 extends through said channel 18 in said longitudinal direction L-L. Conveyor 24 is cooled from below by air (cooling nozzles are symbolized by numeral 24k).

As may been seen from a combination of FIG. 1a, 1b conveyor 24 comprises different sections. Section 24-1, starting at the entry port 20, has a width of 3 m, while the inner width of the channel 18 is slightly larger. Section 24-1 extends up to about ⅔ of the total length of the transportation conveyor at a certain level (L1) defining a surface (24s) for the scrap S to be treated.

In section 24-1 a constructional means designed as a rod 34 is installed, which rod 34 is fixed at the ceiling 16 and protrudes into the scrap layer in order to urge the scrap pieces to tilt and thereby to change their position and provide a different surface area towards heating element 28.

A second conveyor section 24-2 follows section 24-1 in the longitudinal direction L-L towards the exit 22 of said device, but at a lower level (L2) thus forming a mixing step M there between.

This step M is transverse to the longitudinal axis L-L of the device, but angled sections (symbolized in dotted lines) may be provided as well to increase the mixing effect described above.

Scrap S, transported on section 24-1 drops down onto section 24-2, thereby changing its orientation and thus presenting another surface area towards the ceiling 16 of said device. Scrap pieces S in different layers (perpendicular to the conveyor surface) may exchange their position at such step.

Further such steps or other means for varying the position of individual scrap pieces may be installed in said device 10.

Section 24-2 has three sub-sections, namely 24-2a, similar to section 24-1, section 24—following section 24-2a and section 24-2c following section 24-2b and continuing up to the exit door 22 of channel 18.

As best seen in FIG. 1a the conveyor width is reduced in section 24-2b, starting with the same width as section 24-1 and ending with the same width as sub-section 24-2c, the latter being about 1.5 m or half the width of section 24-1.

While the scrap S is transported along section 24-1 in a small layer of about 30 cm height (symbolized by just one layer of scrap pieces compared section 24-2) the limiting sidewalls of conveyor 24 are much higher in sub-sections 24-2b and 24-2c as the same mass of scrap is now arranged in a much thicker layer of about 60 cm at the transition regions between sub-sections 24-2b and 24-2c.

The scraps S is heated along its journey through said device as follows: in the first half of the channel 18 (from the entry 20 towards exit 22) porous ceramic radiation burners 28 each with an active ceramic radiation surface of about 1 m$^2$ are installed just below the ceiling 16 and at a short distance to the scrap S. This arrangement allows a very effective heat transfer. The radiation burners 28 are fired with gas.

Exhaust gases are drawn off from the rear side 28a of these heating elements (radiation burners 28) and fed via inlet ports 30a of a duct 30 to different outlet ports, designed as nozzles 32a, 32b in the sidewalls 14 of the device, above conveyor 20 and slightly above the scrap (layer). According to FIG. 1b nozzles 32a, 32b for recycling exhaust gases (fumes) from the radiation burners 28 into the channel 18 in order to support the pre-heating of the scrap S are installed in the transition regions between sections 24-2a and 24-2b and shortly before the transition region between sub-sections 24-2b and 24-2c.

The advantages of this device 10 with its new features have been described above. Reference is made to the general part of the description.

The invention claimed is:

1. A device configured to transfer a metallurgical material, comprising:
    a channel defined as having a bottom, two side walls, and a ceiling; and a transporter extending in a longitudinal direction of the channel from an entry port of the channel to an exit port of the channel, the transporter configured to receive the metallurgical material on a transportation surface and transfer the metallurgical material with a forward movement in a transportation direction from the entry port to the exit port, wherein the transporter has a transporter width measured perpendicular to the longitudinal direction at the transportation surface, the transporter width varying and having an entry width measured at the entry port greater than an exit width measured at the exit port.

2. The device according to claim 1, wherein the transporter width diminishes by a factor of 10 to 90% between the entry port and exit port.

3. The device according to claim 1, wherein the transporter width diminishes by a factor of 40 to 70% between the entry port and exit port.

4. The device according to claim 1, wherein the transporter width diminishes stepwise in the transportation direction.

5. The device according to claim 1, wherein the transporter width diminishes along a last third of the channel in the transportation direction.

6. The device according to claim 1, wherein the transporter is a conveyor.

7. The device according to claim 1, wherein the transporter is equipped with lateral flares.

8. The device according to claim 1, wherein the transporter is equipped with lateral flares, the lateral flares along a portion of the transporter with smaller width having a greater height, perpendicular to a transportation level, than the lateral flares along that part of the transporter with larger width.

9. The device according to claim 1, including at least one constructional mixer configured to change position of at least part of the metallurgical material transported onto said transporter through the channel.

10. The device according to claim 1, including at least one constructional mixer configured to change position of at least part of the metallurgical material transported onto the transporter through the channel, wherein the at least one constructional mixer is provided by a step, lowering a transportation level of the transporter.

11. The device according to claim 1, including at least one constructional mixer configured to change position of at least part of the metallurgical material transported onto the transporter through the channel wherein the at least one constructional mixer is provided by a step, lowering a transportation level of the transporter, and wherein the step has a vertical height of more than 20 cm.

12. The device according to claim 1, including at least one constructional mixer configured to change position of at least part of the metallurgical material transported onto the transporter through the channel, wherein the at least one constructional mixer is provided by a step, wherein the step is arranged fully or partly perpendicular to the transport direction of the metallurgical material or fully or partly angled with respect to a longitudinal axis of the device or both.

13. The device according to claim 1, including at least one constructional mixer configured to change position of at least part of the metallurgical material transported onto the transporter through the channel, wherein the at least one constructional mixer is provided by a step, lowering a transportation level of the transporter, and wherein a mechanical element is arranged statically within the said device.

14. The device according to claim 1, with at least one heating element, based on radiant energy, is arranged between said entry port and said exit port in such a way that radiant heat released by said heating element being directed towards the metallurgical material onto the transporter.

15. The device according to claim 1, wherein the transporter is configured with a first transport section, wherein the transporter width has a substantially constant width.

16. The device according to claim 15, wherein the transporter is configured with a second transport section, wherein the transporter width diminishes from the substantially constant width of the first transport section to the exit width, wherein the exit width is less than the substantially constant width of the first transport section.

17. The device according to claim 16, wherein the second transport section comprises a first, a second, and a third subsection, the first subsection having a first width substantially equal to the substantially constant width of the first transport section, the second subsection having a variable width that diminishes from the substantially constant width of the first subsection to the exit width.

18. The device according to claim 1, wherein the entry width is less than a channel width, the channel width being a distance between the two side walls.

19. The device according to claim 1, wherein a first section of the transporter is positioned at a first height above the bottom of the channel.

20. The device according to claim 1, wherein the transporter is configured to move the metallurgical material forward in the transportation direction within the channel by vibrating or oscillating.

* * * * *